United States Patent [19]

Higaki et al.

[11] Patent Number: 5,457,167
[45] Date of Patent: Oct. 10, 1995

[54] POLYORGANOSILOXANE-TYPE THERMOPLASTIC RESIN

[75] Inventors: Keigo Higaki; Kouichi Sakurai; Nobuo Kawahashi; Yoichi Kamoshida; Makoto Matsumoto; Kazuto Shinohara; Kouji Kanuma, all of Tokyo, Japan

[73] Assignees: Japan Synthetic Rubber Co., Ltd.; Toshiba Silicone Co., Ltd., both of Tokyo, Japan

[21] Appl. No.: 340,391

[22] Filed: Nov. 15, 1994

[30] Foreign Application Priority Data

Nov. 15, 1993 [JP] Japan .................................. 5-307064

[51] Int. Cl.⁶ .......................................... C08F 283/12
[52] U.S. Cl. ............................ 525/475; 528/25; 528/26; 528/27; 528/28
[58] Field of Search ........................ 525/475; 528/25, 528/26, 28, 27

[56] References Cited

U.S. PATENT DOCUMENTS

| | | | |
|---|---|---|---|
| 4,071,577 | 1/1978 | Falender | 525/479 |
| 4,563,514 | 1/1986 | Liu et al. | 427/54.1 |
| 4,690,986 | 9/1987 | Sasaki et al. | 525/479 |
| 5,147,947 | 9/1992 | Yamamoto et al. | 525/479 |
| 5,218,014 | 6/1993 | Matsumoto | 523/209 |
| 5,274,053 | 12/1993 | Kurata | 525/479 |

FOREIGN PATENT DOCUMENTS

| | | |
|---|---|---|
| 0166900 | 1/1986 | European Pat. Off. . |
| 0367219 | 5/1990 | European Pat. Off. . |
| 0539901 | 5/1993 | European Pat. Off. . |
| 1106073 | 5/1961 | Germany . |
| 3629763 | 3/1988 | Germany .............................. 525/479 |

*Primary Examiner*—Ralph H. Dean
*Attorney, Agent, or Firm*—Oblon, Spivak, McClelland, Maier & Neustadt

[57] ABSTRACT

A polyorganosiloxane-type thermoplastic resin having excellent slidability, abrasion resistance, weatherability, impact strength, fatigue resistance and chemical resistance is disclosed. The thermoplastic resin comprises a graft copolymer (IV) obtained by graft-polymerizing at least one vinyl monomer (v) onto a modified polyorganosiloxane obtained by polymerizing 80 to 99.8% by weight of an organosiloxane (I) having the structural unit described thereinabove, 0.1 to 10% by weight of at least one graft crosslinking agent (II) containing an alkoxysilyl group, selected from the group consisting of a vinyl-type graft crosslinking agent, a mercapto-type graft crosslinking agent, an acryloyl-type crosslinking agent and a vinylphenyl-type crosslinking agent, and 0.1 to 10% by weight of a compound (III) having two alkoxysilyl groups, provided that (I)+(II)+(III)=100% by weight.

10 Claims, No Drawings

POLYORGANOSILOXANE-TYPE THERMOPLASTIC RESIN

FIELD OF THE INVENTION

The present invention relates to a polyorganosiloxane-type thermoplastic resin excellent in not only slidability, abrasion resistance, weatherability, and impact resistance but also fatigue resistance and chemical resistance.

BACKGROUND OF THE INVENTION

The technique of modifying thermoplastic resins with rubbers to improve the impact strength of the resins has been established. Examples of such modified resins include ABS resins obtained by reinforcing styrene-acrylonitrile resins (AS resins) with a butadiene rubber and AAS resins obtained by reinforcing AS resins with an acrylic rubber.

A silicone rubber may be usable as such a base rubber ingredient. However, a mere blend of a polyorganosiloxane with a thermoplastic resin has insufficient impact resistance because of poor compatibility between these ingredients. Although the technique of grafting a vinyl monomer onto a rubber as in the production of ABS resins is needed to obtain good compatibility, polyorganosiloxanes generally have low reactivity with vinyl monomers and hence formation of a graft copolymer is difficult. Several techniques have been disclosed for forming this kind of graft copolymer.

For example, a technique of polymerizing a vinyl monomer in the presence of a polyorganosiloxane containing a vinyl or allyl group to form a graft copolymer having improved impact strength is proposed in JP-A-50-109282. (The term "JP-A" as used herein means an "unexamined published Japanese patent application.")

In JP-A-52-130885 is proposed a technique of improving the impact strength of a vinyl polymer using a polyorganosiloxane containing a mercapto group in place of a polyorganosiloxane containing a vinyl or allyl group.

In JP-A-60-252613, JP-A-61-106614, and JP-A-61-136510 is proposed a technique of polymerizing a vinyl monomer in an emulsion of a polyorganosiloxane containing an acrylic or methacrylic group to thereby obtain a graft copolymer having a high graft efficiency and excellent impact strength.

Further, a technique of graft-polymerizing a vinyl monomer onto a polyorganosiloxane containing a vinylphenyl group to obtain a graft copolymer excellent in impact strength and slidability is proposed in JP-A-2-8209.

With respect to crosslinking agents, a technique of improving the impact resistance of a graft copolymer by using a polyfunctional silane crosslinking agent, e.g., methyltrimethoxysilane or tetraethoxysilane, as an additional crosslinking agent is proposed in JP-A-60-252613 and JP-A-2-8209.

However, in the case of using a polyorganosiloxane containing any of the above-described graft crosslinking agents and not containing any other crosslinking agent, the resin obtained has insufficient fatigue resistance because the modified polyorganosiloxane has a large intermolecular space and hence a weak intermolecular force. In addition, the range of applications of the thus-obtained resin is limited because the polyorganosiloxane swells in organic solvents such as n-hexane and toluene and fuels such as gasoline and illuminating kerosene.

The use of a polyfunctional silane crosslinking agent such as the above-described compounds as an additional crosslinking agent also has a problem that the pliability of polyorganosiloxanes is impaired due to the reduced distance between crosslinking sites and, hence, slidability and fatigue resistance are reduced.

SUMMARY OF THE INVENTION

The present invention has been completed under the above-described circumstances of the defective prior art techniques. An object of the present invention is to provide a polyorganosiloxane-type thermoplastic resin which is excellent not only in slidability, abrasion resistance, weatherability, and impact resistance but in fatigue resistance and chemical resistance.

The present invention provides a polyorganosiloxane-type thermoplastic resin (hereinafter often referred to simply as "thermoplastic resin") which contains a graft copolymer (VI) (hereinafter often referred to as "ingredient (VI)") obtained by graft-polymerizing at least one vinyl monomer (V) (hereinafter often referred to as "ingredient (V)") onto a modified polyorganosiloxane (IV) (hereinafter often referred to as "ingredient (IV)") obtained by polymerizing 80 to 99.8% by weight of an organosiloxane (I) (hereinafter often referred to as "ingredient (I)") having a structural unit represented by the formula $R^1_n SiO_{(4-n)/2}$ (wherein $R^1$ represents a substituted or unsubstituted monovalent hydrocarbon group and n represents an integer of 0 to 3), 0.1 to 10% by weight of a graft crosslinking agent (II) (hereinafter often referred to as "ingredient (II)"), and 0.1 to 10% by weight of a compound (III) (hereinafter often referred to as "ingredient (III)"), provided that (I)+(II)+(III)=100% by weight, the graft crosslinking agent (II) being at least one member selected from the group consisting of a vinyl-containing graft crosslinking agent (II-A) having both a vinyl or allyl group and an alkoxysilyl group, a mercapto graft crosslinking agent (II-B) having both a mercapto group represented by the formula $HSR^2$— (wherein $R^2$ represents a di- or trivalent saturated aliphatic hydrocarbon group having 1 to 18 carbon atoms) and an alkoxysilyl group, an acryloyl-containing graft crosslinking agent (II-C) having both a (meth)acryloyl group represented by the formula t,50
(wherein $R^3$ represents hydrogen atom or methyl group and m represents an integer of 1 to 6) and an alkoxysilyl group, and a vinylphenyl-containing graft crosslinking agent (II-D) having both an unsaturated group represented by the formula t,60
(wherein $R^4$ represents hydrogen atom or an alkyl group having 1 to 6 carbon atoms) and an alkoxysilyl group, the compound (III) being at least one compound represented by the formula
$(R^5O)_p R^6_{3-p} Si$—$R^7$—$SiR^6_{3-p}(OR^5)_p$
(wherein $R^5$ and $R^6$ may be the same or different and each represents a hydrocarbon group having 1 to 12 carbon atoms, $R^7$ represents an aromatic or saturated aliphatic hydrocarbon group, and p represents an integer of 1 to 3).

DETAILED DESCRIPTION OF THE INVENTION

The organosiloxane (I) for use in producing the resin of the present invention has a structural unit represented by the formula described above. Although this organosiloxane may have a linear, branched, or cyclic structure, it is preferably an organosiloxane having a cyclic structure.

Examples of the substituted or unsubstituted monovalent hydrocarbon group contained in this organosiloxane (I) include methyl, ethyl, propyl, vinyl, phenyl, and substituted hydrocarbon groups formed from these groups by substitution with a halogen atom or cyano group. In the structural unit represented by the formula described above, n is an integer of 0 to 3.

Examples of the organosiloxane (I) include cyclic compounds such as hexamethylcyclotrisiloxane, octamethylcyclotetrasiloxane, decamethylcyclopentasiloxane, dodecamethylcyclohexasiloxane, and trimethyltriphenylcyclotrisiloxane, and linear or branched organosiloxanes.

This organosiloxane (I) may be one which has already undergone condensation, e.g., a polyorganosiloxane having a weight-average molecular weight calculated for standard polystyrene of about 500 to 10,000. Where the organosiloxane (I) is a polyorganosiloxane, the molecular ends thereof may have been blocked with, e.g., a hydroxyl, alkoxy, trimethylsilyl, dimethylvinylsilyl, methylphenylvinylsilyl, or methyldiphenylsilyl group.

The proportion of the organosiloxane (I) in ingredients (I) to (III) is from 80 to 99.8% by weight, preferably from 90 to 99% by weight. If the proportion of ingredient (I) is less than 80% by weight, the degree of polymerization of the grafted vinyl polymer decreases with increasing amount of the graft crosslinking agent (II), that is, the vinyl polymer has a low molecular weight, so that sufficient impact strength is not obtained, although the graft ratio increases. On the other hand, if the proportion thereof exceeds 99.8% by weight, a high graft ratio is not obtained and, hence, sufficient impact strength and fatigue resistance cannot be imparted to the graft copolymer (VI).

The graft crosslinking agent (II) for use in producing the resin of this invention is at least one member selected from the group consisting of the vinyl-containing graft crosslinking agent (II-A), mercapto graft crosslinking agent (II-B), acryloyl-containing graft crosslinking agent (II-C), and vinylphenyl-containing graft crosslinking agent (II-D) each described above.

Of these graft crosslinking agents, the vinyl-containing graft crosslinking agent (II-A) is a compound having both a vinyl or allyl group and an alkoxysilyl group. Examples of the vinyl-containing graft crosslinking agent (II-A) include dimethoxymethylvinylsilane, dimethoxyphenylvinylsilane, allyldimethoxymethylsilane, and allyldiethoxyethylsilane. Of these, dimethoxymethylvinylsilane and allyldimethoxymethylsilane are preferred.

The mercapto graft crosslinking agent (II-B) is a compound having both a mercapto group represented by the formula described above and an alkoxysilyl group. Examples of the mercapto graft crosslinking agent (II-B) include γ-mercaptopropyldimethoxymethylsilane.

The acryloyl-containing graft crosslinking agent (II-C) is a compound having both a (meth)acryloyl group represented by the formula described above and an alkoxysilyl group. Examples of the acyloyl-containing graft crosslinking agent (II-C) include γ-methacryloxypropyltrimethoxysilane and γ-methacryloxypropyldimethoxymethylsilane.

The vinylphenyl-containing graft crosslinking agent (II-D) is a compound having both an unsaturated group represented by the formula described above and an alkoxysilyl group.

$R^4$ in the formula is hydrogen atom or an alkyl group having 1 to 6 carbon atoms, preferably hydrogen atom or the alkyl group having 1 or 2 carbon atoms, and more preferably hydrogen atom or methyl.

Examples of the graft crosslinking agent (II-D) include p-vinylphenylmethyldimethoxysilane, 1-(m-vinylphenyl)methyldimethylisopropoxysilane, 2-(p-vinylphenyl)ethylmethyldimethoxysilane, 3-(p-vinylphenoxy)propylmethyldiethoxysilane, 3-(p-vinylbenzoyloxy)propylmethyldimethoxysilane, 1-(o-vinylphenyl)- 1,1,2-trimethyl-2,2-dimethoxydisilane, 1-(p-vinylphenyl)- 1,1-diphenyl-3-ethyl-3,3-diethoxydisiloxane, m-vinylphenyl-[ 3-(triethoxysilyl)propyl]diphenylsilane, and [3-(p-isopropenylbenzoylamino)propyl] phenyldipropoxysilane, and further include mixtures of these compounds.

Preferred examples of the vinylphenyl-containing graft crosslinking agent (II-D) are p-vinylphenylmethyldimethoxysilane, 2-(p-vinylphenyl)ethylmethyldimethoxysilane, and 3-(p-vinylbenzoyloxy)propylmethyldimethoxysilane.

Of these graft crosslinking agents (II), the graft crosslinking agents (II-B) and (II-D) are preferred, and (II-D) is more preferred. By use of the graft crosslinking agent (II-D), further improved slidability, impact strength, fatigue resistance, abrasion resistance, and chemical resistance are obtained.

Preferred examples of these graft crosslinking agents (II) are p-vinylphenylmethyldimethoxysilane and 2-(p-vinylphenyl)ethyldimethoxysilane.

These graft crosslinking agents (II) may be used alone or in combination of two or more thereof.

The proportion of the graft crosslinking agent (II) in ingredients (I) to (III) is from 0.1 to 10% by weight, preferably from 0.5 to 5% by weight. If the proportion thereof is less than 0.1% by weight, a high graft ratio is not obtained in the graft polymerization of the thus-obtained modified polyorganosiloxane (IV) with a vinyl monomer (V) and, as a result, the bonding strength at the interface between the modified polyorganosiloxane (IV) and the grafted vinyl polymer is reduced. Thus, the resulting graft copolymer (VI) suffers delamination and has insufficient impact strength and fatigue resistance. On the other hand, if the proportion of ingredient (II) exceeds 10% by weight, the degree of polymerization of the grafted vinyl polymer decreases with increasing amount of the graft crosslinking agent (II), that is, this vinyl polymer has a low molecular weight, so that sufficient impact strength is not obtained, although the graft ratio increases.

The compound (III) for use in producing the resin of this invention is a compound represented by the formula described hereinabove. In the formula, $R^5$ and $R^6$ may be the same or different and each represents a hydrocarbon group having 1 to 16 carbon atoms, preferably methyl, ethyl, or phenyl, more preferably methyl, and $R^7$ represents an aromatic or saturated aliphatic hydrocarbon group, preferably an aromatic hydrocarbon group.

The weight-average molecular weight of the compound (III) is desirably from 150 to 3,000, but is preferably from 200 to 600 from the standpoint of balance among sliding properties, impact resistance, fatigue resistance, and chemical resistance.

Examples of the compound (III) include compounds (III-A) to (III-D) specified below and combinations of two or more thereof, but compound (III-C) is preferred. t,110

The proportion of the compound (III) in ingredients (I) to (III) is from 0.1 to 10% by weight, preferably from 0.1 to 5% by weight. If the proportion thereof is less than 1% by weight, the crosslink density in the modified polyorganosiloxane (IV) obtained is so low that sufficient fatigue resistance and chemical resistance cannot be imparted to the graft copolymer (VI). On the other hand, if the proportion thereof exceeds 10% by weight, the modified polyorganosiloxane (IV) obtained has impaired pliability and, hence, the graft copolymer (VI) has reduced sliding properties, although fatigue resistance and chemical resistance are improved.

The modified polyorganosiloxane (IV) can be produced by polymerizing the above-described organosiloxane (I), graft crosslinking agent (II), and compound (III) by, for example, mixing these ingredients with shearing using a homomixer or the like in the presence of an emulsifying agent, e.g., an alkylbenzenesulfonic acid. This emulsifying agent functions not only to emulsify the organosiloxane (I) but also as a polymerization initiator.

This emulsifying agent is used in an amount of usually about from 0.1 to 5% by weight, preferably about from 0.3 to 3% by weight, based on the weight of the total amounts of the ingredients (I) to (III).

For this polymerization, water is used in an amount of usually from 100 to 500 parts by weight, preferably from 200 to 400 parts by weight, per 100 parts by weight of the total amount of ingredients (I) to (III). The polymerization temperature is usually from 5° to 100° C.

The modified polyorganosiloxane (IV) thus obtained has a weight-average molecular weight calculated for standard polystyrene of usually about from 30,000 to 1,000,000, preferably about from 50,000 to 300,000.

Graft-polymerizing a vinyl monomer (V) onto the thus-obtained modified polyorganosiloxane (IV) gives the polyorganosiloxane-type thermoplastic resin of the present invention which contains a graft copolymer (VI).

Examples of the vinyl monomer (V) for use in producing the resin of this invention include aromatic alkenyl compounds such as styrene, α-methylstyrene, and sodium styrenesulfonate; methacrylic esters such as methyl methacrylate, ethyl methacrylate, 2-ethylhexyl methacrylate, butyl methacrylate, and allyl methacrylate; acrylic esters such as methyl acrylate, ethyl acrylate, butyl acrylate, hydroxyethyl acrylate, and dimethylaminoethyl acrylate; vinyl cyanide compounds such as acrylonitrile and methacrylonitrile; olefins such as ethylene and propylene; conjugated dienes such as butadiene, isoprene, and chloroprene; and other vinyl compounds such as vinyl acetate, vinyl chloride, vinylidene chloride, triallyl isocyanurate, acrylic acid, methacrylic acid, N-phenylmaleimide, N-cyclohexylmaleimide, and maleic anhydride. These compounds may be used alone or in admixture.

From the standpoint of further improving the impact resistance of the polyorganosiloxane-type thermoplastic resin of this invention, the vinyl monomer (V) preferably comprises 65 to 75% by weight of styrene and 35 to 25% by weight of acrylonitrile.

For the graft polymerization of the vinyl monomer (V) onto the modified polyorganosiloxane (IV), ingredients (IV) and (V) are introduced into the system in amounts of from 5 to 80% by weight, preferably 10 to 60% by weight, and of from 95 to 20% by weight, preferably 90 to 40% by weight, respectively, based on the weight of the total amounts of ingredients (IV) and (V). If the amount of ingredient (IV) is less than 5% by weight, sufficient impact strength is not obtained. On the other hand, if the amount of ingredient (IV) exceeds 80% by weight, the proportion of the grafted vinyl polymer decreases and, as a result, the bonding strength at the interface between the modified polyorganosiloxane (IV) and vinyl polymer is insufficient. Thus, the thermoplastic resin has a defective appearance and reduced impact strength.

The graft ratio in the graft copolymer (VI) thus obtained is usually about 20% by weight or higher, preferably about 80% by weight or higher, more preferably about 100% by weight or higher. Such a high graft ratio in the graft copolymer (VI) enhances the bonding strength at the interface between the graft copolymer (VI) and the vinyl polymer which has not undergone direct grafting. As a result, the modified polyorganosiloxane (IV) is homogeneously dispersed in the ungrafted vinyl polymer, giving a thermoplastic resin having a satisfactory appearance and excellent impact strength.

The thermoplastic resin of the present invention contains, besides the thus-obtained graft copolymer (VI), an ungrafted vinyl polymer which is a polymer of the vinyl monomer (V). The content of the graft copolymer (VI) in the resin is usually 5% by weight or higher, preferably 10% by weight or higher.

In producing the thermoplastic resin of the present invention, ordinary radical polymerization is used to graft-polymerize the vinyl monomer (V) onto the modified polyorganosiloxane (IV) to obtain the desired resin as a composition containing the graft copolymer (VI).

It should be noted that use of some kinds of radical polymerization initiators necessitates neutralizing a latex of the modified polyorganosiloxane (IV) with an alkali, which latex is acidic due to the addition of an alkylbenzenesulfonic acid as described hereinabove. Examples of the alkali include sodium hydroxide, potassium hydroxide, sodium carbonate, sodium hydrogen carbonate, triethanolamine, and triethylamine.

Examples of the radical polymerization initiator include redox initiators comprising a combination of an oxidizing agent selected from organic hydroperoxides, e.g., cumene hydroperoxide, diisopropylbenzene hydroperoxide, and p-menthane hydroperoxide, with a reducing agent such as a saccharated iron pyrophosphate formulation, sulfoxylate formulation, or saccharated iron pyrophosphate/sulfoxylate mixed formulation; persulfates such as potassium persulfate and ammonium persulfate; azo compounds such as azobisisobutyronitrile, dimethyl 2,2'-azobisisobutyrate, and 2-carbamoylazaisobutyronitrile; and organic peroxides such as benzoyl peroxide and lauroyl peroxide. Of these, the redox initiators are preferred. These radical polymerization initiators are used in an amount of usually about from 0.05 to 5 parts by weight, preferably about from 0.1 to 3 parts by weight, per 100 parts by weight of the vinyl monomer (V) used.

This radical polymerization method is desirably carried out by emulsion polymerization or solution polymerization, preferably by emulsion polymerization.

The emulsion polymerization may use a known emulsifying agent, the above-described radical initiator, a chain transfer agent, etc.

Examples of the emulsifying agent include anionic emulsifying agents such as sodium dodecylbenzenesulfonate, sodium lauryl sulfate, sodium salt of diphenyl ether disulfonic acid, and sodium salt of a dialkali succinate sulfonic acid, and nonionic emulsifying agents such as polyoxyethylene alkyl esters and polyoxyethylene alkylaryl ethers. These may be used alone or in combination of two or more thereof. The emulsifying agent is used in an amount of usually about from 0.5 to 5% by weight based on the weight of the vinyl monomer (V).

Examples of the chain transfer agent include mercaptans such as t-dodecyl mercaptan, octyl mercaptan, n-tetradecyl mercaptan, and n-hexyl mercaptan, and halides such as carbon tetrachloride and ethylene bromide. The chain transfer agent is used in an amount of usually from 0.02 to 1% by weight based on the weight of the vinyl monomer (V).

Besides the radical polymerization initiator, emulsifying agent, chain transfer agent, etc., any of various electrolytes, pH regulators, and the like may be used for the emulsion polymerization if desired and necessary. In general, water is used in an amount of 100 to 500 parts by weight per 100 parts by weight of the vinyl monomer (V), and the radical polymerization initiator, emulsifying agent, and chain transfer agent described above are added in respective amounts within the above-specified ranges along with other additives if necessary. The emulsion polymerization is conducted generally at a temperature of 5° to 100° C., preferably 50° to 90° C., for 0.1 to 10 hours.

In the case of emulsion polymerization, it may also be carried out by adding the vinyl monomer (V) and a radical initiator to the latex of the modified organopolysiloxane (IV) which latex has been obtained by the polymerization of the organosiloxane (I), graft crosslinking agent (II), and compound (III).

Where emulsion polymerization is used to produce the polyorganosiloxane-type thermoplastic resin of the present invention, the resin can be purified by coagulating the emulsion with a salt in a conventional manner, washing the resulting powder with water, followed by drying.

The thus-obtained thermoplastic resin of this invention, which contains the graft copolymer (VI), may be pelletized with a kneading machine such as an extruder.

During this pelletization, other conventional polymer may be suitably blended with the resin of this invention according to a desired performance in an amount of usually 99% by weight or less, preferably 90% by weight or less, to give a thermoplastic resin composition (hereinafter often referred to simply as "thermoplastic resin composition").

Examples of such an other conventional polymer include diene rubbers such as polybutadiene, butadiene-styrene copolymers, acrylonitrile-butadiene copolymers, polyisoprene, and natural rubber; olefin rubbers such as acrylic rubbers, ethylene-propylene copolymers, ethylene-propylene-diene copolymers, chlorinated butyl rubbers, and chlorinated polyethylenes; aromatic vinyl-conjugated diene block copolymers such as styrene-butadiene block copolymers, styrene-butadiene-styrene block copolymers, and styrene-butadiene-styrene radial teleblock copolymers; hydrogenation products obtained from these block copolymers; and other polymers including polypropylene, polyethylene, polystyrene, styrene-acrylonitrile copolymers, rubber-toughened polystyrenes (HIPS), acrylonitrile-butadiene-styrene resins (ABS resins), acrylonitrile-ethylenepropylene-styrene resins (AES resins), methyl methacrylate-butadiene-styrene resins (MBS resins), acrylonitrile-butadiene-methyl methacrylate-styrene resins, acrylonitrile-n-butyl acrylate-styrene resins (AAS resins), poly(vinyl chloride), polycarbonates, poly(ethylene terephthalate), poly(butylene terephthalate), polyacetals, polyamides, epoxy resins, poly(vinylidene fluoride), polysulfones, ethylene-vinyl acetate copolymers, PPS resins, polyetheretherketones, PPO resins, styrene-methyl methacrylate copolymers, styrene-maleic anhydride copolymers, rubber-modified PPO resins, styrene-maleimide copolymers, rubber-modified styrene-maleimide copolymers, polyamide elastomers, and polyester elastomers.

The pelletized thermoplastic resin (composition) may be processed and molded by an ordinary means, e.g., compression molding or injection molding.

The present invention will be explained below in more detail by reference to Examples, but the invention should not be construed as being limited thereto. In the Examples, all parts and percents are by weight unless otherwise indicated.

In the Examples, various properties were examined by the following methods.

Graft Ratio

A given amount (X) of a graft polymerization product was added to acetone, and this mixture was shaken with a shaking machine for 2 hours to dissolve any free copolymer. The resulting mixture was centrifuged with a centrifugal machine at 23,000 rpm for 30 minutes. The insoluble ingredient was recovered and then dried in a vacuum dryer at 120° C. for 1 hour. Thus, the insoluble weight (Y) was determined. Using the following equation, the graft ratio was calculated. t,200

Melt Flow Rate (MFR)

Measurement was made according to JIS K7210 at a temperature of 220° C. and a load of 10 kgf.

Gloss (%)

Measurement was made according to ASTM D523 at $\theta=45°$.

Izod Impact Strength (Notched)

Measurement was made according to ASTM D256 using ¼ inch test pieces at 23° C.

Weathering Test

200-Hour weathering (63° C., with rain) was conducted using a sunshine weatherometer [Type WE-USN-HC, manufactured by Toyo Rika K.K., Japan], and the Izod impact strength was then measured.

Sliding Property

An abrasion test was conducted on a Suzuki-type sliding tester using steel (S45C) as a mating material. The test pieces used were in the shape of a hollow cylindrical having an outer diameter of 25.6 mm and an inner diameter of 20.0 mm, and the mating material had the same shape.

Kinematic friction coefficient was measured in an atmosphere having a temperature of 23° C. and a humidity of 50% under conditions of a load of 5 kg and a running speed of 3.75 cm/sec.

The kinematic friction coefficient is calculated using the following equation:

$$\mu=[3\times F\times(r_2^2-r_1^2)]/[P\times(r_2^3-r_1^3)]$$

(wherein $\mu$ is kinematic friction coefficient, F is force imposed on the load cell, P is load, R is arm length to the load cell, $r_1$ is inner diameter, and $r_2$ is outer diameter).

Abrasion loss was measured in an atmosphere having a temperature of 23° C. and a humidity of 50% under conditions of a load of 10 kg, a running speed of 15 cm/sec, and 80,000 revolutions (running distance, 6 km).

Fatigue Strength

The stress at break of a sample after $10^7$ cycles was measured according to JIS K7118 using a Schenk fatigue tester of the fixed stress amplitude type.

Chemical Resistance

An injection-molded test piece having dimensions of 3×40×80 mm was immersed in a solvent at 23° C. for 24 hours, and the resistance to the solvent was visually judged.

⊚: completely no change in appearance
○: no blushing
△: partly blushed
x: swelled and blushed

EXAMPLE 1

97.6 Parts of octamethylcyclotetrasiloxane was mixed with 1.7 parts of 2-(p-vinylphenyl)ethylmethyldimethoxysilane and, as ingredients (III), 0.3 part of 1,4-bis[2-(dimethoxy)(methyl)silyethyl] benzine and 0.4 part of 1-[1-(dimethoxy)(methyl)silylethyl]- 4-[2-(dimethoxy)(methyl)silylethyl]benzene. This mixture was added to 300 parts of distilled water containing 2.0 parts of dodecylbenzenesulfonic acid dissolved therein, and the resulting mixture was agitated with a homomixer for 3 minutes to obtain an emulsion.

This emulsion was transferred to a separable flask equipped with a condenser, nitrogen inlet, and stirrer. The contents were heated at 90° C. for 5 hours with stirring and then aged at 35° C. for 5 hours to complete polymerization.

In the modified polyorganosiloxane (IV) thus obtained, the polymerization conversion octamethylcyclotetrasiloxane was 90.6%.

This modified-polyorganosiloxane latex was neutralized to pH 7 with aqueous sodium carbonate solution. The neutralized modified-polyorganosiloxane latex in an amount of 35 parts on a dry basis was mixed with 0.5 parts of sodium dodecylbenzenesulfonate and 140 parts of distilled water. This mixture was transferred to a separable flask equipped with a dropping bottle, condenser, nitrogen inlet, and stirrer. Thereto were added 15.81 parts of styrene, which amount was 34% of the total styrene amount, 6.29 parts of acrylonitrile, which amount was 34% of the total acrylonitrile amount, 0.2 part of sodium pyrophosphate, 0.25 parts of dextrose, 0.004 part of ferrous sulfate, and 0.074 part of cumene hydroperoxide. The contents were heated to 70° C. in a nitrogen stream.

After polymerization was conducted for 1 hour, a liquid mixture consisting of 30.69 parts of styrene as the remaining styrene, 12.21 parts of acrylonitrile as the remaining acrylonitrile, 1.084 parts of sodium dodecylbenzenesulfonate, 42 parts of distilled water, 0.12 part of cumene hydroperoxide, and 0.06 part of t-dodecyl mercaptan was added dropwise from the dropping bottle over a period of 3 hours. After completion of the addition, the polymerization reaction was conducted for 1 hour and the reaction mixture was then cooled.

The graft copolymer latex thus obtained was poured into warm water containing 2 parts of calcium chloride dihydrate dissolved therein to coagulate the latex with the salt. The thermoplastic resin containing the graft copolymer was separated from the aqueous phase, washed with water sufficiently, and then dried at 80° C. for 16 hours to complete purification.

Subsequently, 57% of this thermoplastic resin powder was mixed with 43% of copolymer (AS resin) obtained by emulsion polymerization from styrene and acrylonitrile in a ratio of 75:25 by weight, thereby obtaining a thermoplastic resin composition. This thermoplastic resin composition was extruded using a twin-screw extruder at a cylinder temperature of 230° C. to obtain pellets.

The thermoplastic resin composition obtained was excellent in chemical resistance, weatherability, slidability, impact resistance, and appearance. The evaluation results obtained are shown in Table 1.

EXAMPLES 2 TO 6

Modified polyorganosiloxanes (IV) were produced in the same manner as in Example 1 except that the amount of the organosiloxane (I), the kind and amount of the graft crosslinking agent (II), and the kinds and amounts of the compounds (III) were changed. A thermoplastic resin and thermoplastic resin compositions were then produced in the same manner as in Example 1 except that the kinds and amounts of the vinyl monomers (V) used with the modified polyorganosiloxane (IV) for producing the graft copolymer (VI) and the kind and amount of the blending resin were changed. Evaluations were conducted in the same manner as in Example 1. The results obtained are shown in Table 1.

COMPARATIVE EXAMPLE 1

A modified polyorganosiloxane (IV) was produced in the same manner as in Example 1 except that 99.95 parts of octamethylcyclotetrasiloxane and 0.05 part of p-vinylphenylmethyldimethoxysilane were used. The subsequent procedure was carried out in the same manner as in Example 1 to produce a thermoplastic resin composition. This composition was evaluated in the same manner as in Example 1. The results obtained are shown in Table 1.

COMPARATIVE EXAMPLES 2 AND 3

Modified polyorganosiloxanes (IV) were produced in the same manner as in Comparative Example 1 except that the amount of the organosiloxane (I), the kind and amount of the graft crosslinking agent (II), and the kind and amount of compound (III) were changed. Thermoplastic resin (compositions) were then produced in the same manner as in Comparative Example 1 except that the kinds and amounts of the vinyl monomers (V) used with the modified polyorganosiloxane (IV) for producing the graft copolymer (VI) and the kind and amount of the blending resin were changed. Evaluations were conducted in the same manner as in Comparative Example 1. The results obtained are shown in Table 1.

As apparent from Table 1, the thermoplastic resin and thermoplastic resin compositions according to the present invention (Examples 1 to 6) had an excellent balance among sliding properties, impact resistance, fatigue resistance, and chemical resistance.

In contrast, the composition of Comparative Example 1, in which the amounts of the graft crosslinking agent (II) and compound (III) were below the respective lower limits specified in the present invention, was reduced in impact resistance and sliding properties because the bonding strength at the interface between the rubber phase and the matrix phase was low due to the extremely low graft ratio in the graft copolymer (VI). In addition, this comparative composition was also reduced in fatigue resistance and chemical resistance because the modified polyorganosiloxane (IV) had an enlarged intermolecular space due to the nonuse of compound (III).

The composition of Comparative Example 2, in which the amounts of the graft crosslinking agent (II) and the compound (III) were above the respective upper limits specified in the present invention, was reduced in sliding properties, although it had almost intact fatigue and chemical resistance because the graft copolymer (VI) had a high graft ratio and a high crosslink density in contrast to the graft copolymer (VI) in Comparative Example 1.

Further, the composition of Comparative Example 3, in which a known polyfunctional silane crosslinking agent, i.e., methyltrimethoxysilane, was used, was reduced in sliding properties and fatigue resistance because the pliability of the polyorganosiloxane had been impaired due to the reduced distance between crosslinking sites. t,270

The polyorganosiloxane-type thermoplastic resin of the present invention is excellent not only in slidability, abrasion resistance, weatherability, and impact resistance but also in fatigue resistance and chemical resistance and has a wide range of excellent performances which have not been attained by any conventional thermoplastic resin. Therefore, the polyorganosiloxane-type thermoplastic resin of the present invention is applicable also to various fields where conventional thermoplastic resins have been unusable, and is hence industrially highly significant.

While the invention has been described in detail and with reference to specific embodiments thereof, it will be apparent to one skilled in the art that various changes and modifications can be made therein without departing from the spirit and scope thereof.

What is claimed is:

1. A polyorganosiloxane thermoplastic resin which comprises a graft copolymer (VI) obtained by graft-polymerizing at least one vinyl monomer (V) onto a modified polyorganosiloxane (IV) obtained by polymerizing 80 to 99.8% by weight of an organosiloxane (I) having a structural unit represented by the formula $R^1{}_nSiO_{(4-n)/2}$, wherein $R^1$ represents a substituted or unsubstituted monovalent hydrocarbon group and n represents an integer of 0 to 3, 0.1 to 10% by weight of a graft crosslinking agent (II), and 0.1 to 10% by weight of a compound (III), provided that (I)+(II)+(III)= 100% by weight, said graft crosslinking agent (II) being at least one member selected from the group consisting of a vinyl-containing graft crosslinking agent (II-A) having a vinyl or allyl group and an alkoxysilyl group, a mercapto graft crosslinking agent (II-B) having both a mercapto group represented by the formula $HSR^2-$, wherein $R^2$ represents a di- or trivalent saturated aliphatic hydrocarbon group having, 1 to 18 carbon atoms, and an alkoxysilyl group, an acryloyl-containing graft crosslinking agent (II-C) having both a (meth)acryloyl group represented by the formula t,350 wherein $R^3$ represents hydrogen atom or methyl group and m represents an integer of 1 to 6, and an alkoxysilyl group, and a vinylphenyl-containing graft crosslinking agent (II-D) having both an unsaturated group represented by the formula t,351 wherein $R^4$ represents hydrogen atom or an alkyl group having 1 to 6 carbon atoms, and an alkoxysilyl group, said compound (III) being at least one compound represented by the formula $(R^5O)_p R^6{}_{3-p}Si—R^7—SiR^6{}_{3-p}(OR^5)_p$ wherein $R^5$ and $R^6$ may be the same or different and each represents a hydrocarbon group having 1 to 12 carbon atoms, $R^7$ represents a divalent aromatic or saturated aliphatic hydrocarbon group, and p represents an integer of 1 to 3.

2. A polyorganosiloxane thermoplastic resin as claimed in claim 1, wherein the organosiloxane (I) is an organosiloxane having a cyclic structure.

3. A polyorganosiloxane thermoplastic resin as claimed in claim 2, wherein the organosiloxane (I) is cyclic compounds selected from the group consisting of hexamethylcyclotrisiloxane, octamethylcyclotetrasiloxane, decamethylcyclopentasiloxane, dodecamethylcyclohexasiloxane, and trimethyltriphenylcyclotrisiloxane.

4. A polyorganosiloxane thermoplastic resin as claimed in claim 1, wherein the graft crosslinking agent (II) is the graft crosslinking agent (II-B) or (II-D).

5. A polyorganosiloxane thermoplastic resin as claimed in claim 1, wherein the graft crosslinking agent (II) is used in an amount of from 0.5 to 5% by weight.

6. A polyorganosiloxane thermoplastic resin as claimed in claim 1, wherein the compound (III) has a weight average molecular weight of from 150 to 3,000.

7. A polyorganosiloxane thermoplastic resin as claimed in claim 1, wherein the compound (III) is used in an amount of from 0.1 to 5% by weight.

8. A polyorganosiloxane thermoplastic resin as claimed in claim 1, wherein the modified polyorganosiloxane (IV) has a weight average molecular weight calculated for standard polystyrene of from 30,000 to 100,000.

9. A polyorganosiloxane thermoplastic resin as claimed in claim 1, wherein the vinyl monomer (V) is at least one selected from the group consisting of aromatic alkenyl compounds, methacrylic esters, acrylic esters, vinyl cyanide compounds, olefins, conjugated dienes, vinyl acetate, vinyl chloride, vinylidene chloride, trialkyl isocyanurate, acrylic acid, methacrylic acid, N-phenylmaleimide, N-cyclohexylmaleimide, and maleic anhydride.

10. A polyorganosiloxane thermoplastic resin as claimed in claim 1, wherein the vinyl monomer (V) comprises 65 to 75% by weight of styrene and 35 to 25% by weight of acrylonitrile.

* * * * *